US007803869B2

(12) United States Patent
Warren

(10) Patent No.: US 7,803,869 B2
(45) Date of Patent: Sep. 28, 2010

(54) WATER BASED REMOVABLE PAINT FORMULATION AND SYSTEM

(75) Inventor: Donald Warren, Carrollton, GA (US)

(73) Assignee: Donald C. Warren, Carrollton, GA (US)

( * ) Notice: Subject to any disclaimer, the term of this patent is extended or adjusted under 35 U.S.C. 154(b) by 652 days.

(21) Appl. No.: 11/598,967

(22) Filed: Nov. 14, 2006

(65) Prior Publication Data

US 2007/0112126 A1    May 17, 2007

Related U.S. Application Data

(60) Provisional application No. 60/736,421, filed on Nov. 14, 2005.

(51) Int. Cl.
   *C08F 2/16*     (2006.01)
   *C08F 2/22*     (2006.01)
   *C08F 220/18*   (2006.01)
   *C08L 35/00*    (2006.01)

(52) U.S. Cl. .................. 524/804; 524/812; 524/832

(58) Field of Classification Search ................ 524/804, 524/812, 832, 501, 502
   See application file for complete search history.

(56) References Cited

U.S. PATENT DOCUMENTS

| 4,622,360 A | * | 11/1986 | Gomi et al. | 524/507 |
| 5,453,459 A | * | 9/1995 | Roberts | 524/123 |
| 5,912,298 A | * | 6/1999 | Gomi et al. | 524/591 |
| 6,011,107 A | * | 1/2000 | Maxwell et al. | 524/566 |

OTHER PUBLICATIONS http://www.virginiadot.org/BUSINESS/bu-mat-PaveMarkCh2.pdf, Virginia Department of Transportation, Chapter 2, p. 1-20, Oct. 2001.*

* cited by examiner

*Primary Examiner*—Vasu Jagannathan
*Assistant Examiner*—Karuna P Reddy
(74) *Attorney, Agent, or Firm*—Adams & Wilks

(57) ABSTRACT

A weather resistant, easily removable paint composition for application over a surface or over another paint. The removable paint composition comprises from about 19 to about 34% by weight of a combination of two different acrylic polymers, from about 0.2 to 4% by weight of an aliphatic water-borne urethane polymer, from 0.06% to 0.6% by weight of an alkali, and water. The removable paint composition can be removed without damaging the underlying surface or paint.

13 Claims, No Drawings

WATER BASED REMOVABLE PAINT FORMULATION AND SYSTEM

CROSS-REFERENCE TO RELATED APPLICATION

This application claims priority to copending U.S. provisional application entitled, "A WATER BASED REMOVABLE PAINT FORMULATION AND SYSTEM" having Ser. No. 60/736,421, filed Nov. 14, 2005 which is entirely incorporated herein by reference.

TECHNICAL FIELD

The invention is for a removable paint or coating, a paint remover for removing the paint or coating, a system for a removable coating and removing of the coating and a method for coating or painting the hard or sealed surface of articles, floors and roads and removing the coating or paint. The paint composition can be used to provide a removable paint to a highway which can be readily removed when needed.

BACKGROUND OF THE INVENTION

It is many times desirable to have a removable paint formulation that can be applied over a hard surface or over another paint and subsequently removed without damaging the underlying surface or paint. This is difficult to accomplish because the solvents that will remove the removable paint that it is intended to remove may also remove the underlying paint or damage its luster or pose environmental or fire hazards. A removable paint would be desirable for automobile signs, and removable colors on surfaces, such as floors and other hard or sealed surfaces and movie sets. A removable paint that could be applied to highway surfaces, such as concrete or asphalt, is especially desirable. The paint would need to withstand the wear and temperature extremes experienced on highway surfaces, but be easily removable during those surface extreme conditions and under normal conditions.

There is also a need for temporary protective coating or paint for equipment or vehicles that are exposed to the environment. Such a coating or paint which can be applied quickly with little effort, is resistant to environmental damage and can be removed easily after weathering for an extended period.

SUMMARY OF THE INVENTION

An easily removable durable paint or coating and a paint remover for removing the paint is provided by this invention. The removable paint is a dispersion of a balanced formulation of acrylic polymers and a urethane polymer. The combination is neutralized with an alkali. Ammonium hydroxide is preferred. From 19 to 34% (based on dry solids weight) of the dispersion is an acrylic polymer, with 0.2 to 4% of a urethane polymer and 0.06 to 0.6% (based on dry weight) of an alkali and the balance is water. These percentages are based on the dry weight of ingredients. Preferably from 22 to 30% of the formulation is the acrylic polymer and the urethane polymer is present in an amount from 0.4 to 1.2% and ammonium hydroxide is present in an amount of 0.06 to 0.3%, all of these percentages being by dry weight in the formulation. Excellent results are obtained when the acrylic polymer is present in an amount of approximately 26% by dry weight and the urethane polymer is present in an amount of approximately 0.7% by dry weight and the ammonium hydroxide is present in an amount of about 0.28% by dry weight.

It is preferred to use a combination of acrylic polymers in which 19 to 26% of the formulation is of an acrylic polymer with an acid number between 60 and 70 and a hardness temperature (glass transition temperature) (Tg) of between 26° C. and 30° C. and 2.4% to 6.0% by weight of an acrylic polymer with an acid number between 28 and 34 and a hardness temperature (Tg) of between 22° C. and 26° C. Preferably the urethane polymer dispersion has a viscosity (cP) of from 120 to 130 and a pH of 8+/−1.5 and the urethane is present in an amount of from 0.4 to 1.2% by weight. The proportion between the acrylic polymers can be adjusted to achieve the desired characteristics of the paint and the amount of acrylic polymer present can be adjusted in relationship to the urethane polymer to achieve the desired characteristics.

Pigment or dyes can be added to the mixture to make the coating a paint. Effect particles, such as reflective beads can be added to the mixture to provide reflective qualities which is especially important in applications to highways and airports. Various other effects can be achieved, such as by addition of iridescent pearl pigment or ultraviolet light reflective pigments.

The removable paints and coatings of this invention can be removed by contact with alkaline solutions that contain a surfactant. A preferred remover solution comprises 1 to 5% ammonium hydroxide, 2 to 5% of alkali thickeners and the balance water. The remover solution is applied to the coating or paint and brushed or otherwise agitated and allowed to set for a few minutes and then removed by water. Another type of remover composition is a combination of dibasic esters and thickeners.

DETAILED DESCRIPTION OF THE INVENTION

An easily removable coating or paint is provided by this invention. A paint remover is provided for removing the paint or coating under normal conditions. A paint remover for removing the paint from a surface that is very hot, such as a highway in the summertime, is also provided. The remover breaks up the paint and allows the water dispersion of the residue, which may be collected to prevent damage to the environment.

The removable paint is a carefully balanced formulation of acrylic polymers and a urethane polymer. Acrylic polymeric colloidal dispersions such Carboset® 514-H, manufactured by Noveon, Inc., are used in the water-based removable coatings and paints of the present invention. This dispersion has 40% weight total solids and is supplied in ammonia water and has a pH of between 6.6 and 7.4. The Carboset® 514-H has a relatively high acid number of about 65 and hardness temperature (glass transition) (Tg) of about 28° C.

Preferably another acrylic polymeric colloidal dispersion is also used to obtain the correct balance of hardness and acidity. The Carboset® 519 dispersion has 40% weight total solids and has been found to be useful. Carboset® 519 has lower acid number of about 32 and hardness temperature (Tg) of 24° C., and a pH of between 7.9 and 8.7. The combined effect of the properties of these two acrylic polymers provides the right degree of adhesion, alkali resistance, flexibility, hardness and surface tack of the film. This combination is especially useful to permit the easy removal of the coating or paint but yet insure adequate adhesion and hardness prior to removal. The combination of the Carboset® 514-H and 519 is especially important because the dried film of the 514-H is more readily dissolved by alkalis compared to the 519 because the 514-H has a higher acid number. Thus when an alkali based remover composition is applied to the coating of this invention it will start dissolving the 514-H component of the coating first and then proceed on to dissolving the 519 and allowing the coating to be removed from the surface.

The acrylic polymers can be neutralized by caustic soda, caustic potash, amines, alkanol amines or ammonia. Ammonia is preferred.

A polyurethane is included in the coating or paint. Polyurethane provides a surface hardness as well as flexibility giving the paint or coating a high abrasion and scuff resistance. The preferred polyurethane is Sancure® 815, which is manufactured by Noveon, Inc. as a dispersion of 35% weight total solids, and has a viscosity (cP) of about 125 with a pH of 8+/−1. It has a gloss at a 60° angle of 87 and a Sward hardness of 70. The properties of alkali resistance, adhesion, flexibility, surface hardness and tackiness can be balanced by adjusting the amount of Carboset® 514, 519 and polyurethane in the formulation. The Sancure® 815 provides a film that is hard, glossy but flexible and with a high tensile strength which improves the quality of the coating or paint. The Sancure® 815 has a high abrasion resistance and a high resistance to alkali and detergent. A small quantity of the Sancure® 815 gives the final coating the necessary hardness and resistance which is especially important for use on highways.

Pigment can be added to the coating formulation to make a paint. Typically, pigment in an amount of from 6 to 22% by weight of the formulation to be sprayed or brushed on a surface is added depending on the pigment color and other factors.

The coating or paint (not including the pigment) of this invention can also include optional ingredients such as preservatives, biocides, thickeners, special effects additives and the like. Proxel GXL has proven to be a good preservative and biocide. These additional ingredients are not critical to the function of the coating or the paint but aid in improving the commercial utility and have other advantages.

A dispersion of a coating or paint (not including the pigment) of the present invention preferably comprises:

| COMPONENT | % BY DRY WEIGHT |
| --- | --- |
| Acrylic polymer or co-polymer | 19-34 |
| Polyurethane | 0.2-4 |
| Ammonium hydroxide | 0.06-0.6 (active content) |
| Water | Balance |

A dispersion of a preferred coating or paint (not including the pigment) composition comprises:

| COMPONENT | % BY DRY WEIGHT |
| --- | --- |
| Acrylic polymer or co-polymer | 22-30 |
| Polyurethane | 0.4-1.2 |
| Ammonium hydroxide | 0.06-0.3 (active content) |
| Water | Balance |

A mixture of acrylic polymers provides the optimum characteristics for the coating. It has been found that a dispersion of from 19 to 26% (by weight of dry solids) of an acrylic polymer with an acid number of between 60 and 70 and a hardness temperature (Tg) of between 26° C. and 30° C. mixed with 2.4 to 6% (by weight of dry solids) of an acrylic polymer with an acid number of between 28 and 34 and a hardness temperature (Tg) of between 22° C. and 26° C. results in a good balance of the acrylic polymers. This is preferably mixed with from 0.4 to 1.2% (by weight of dry solids) of a urethane polymer with a viscosity (cP) of 120 to 130 and pH of 8+/−1.5 to achieve a good balance of the characteristics of scuff resistance, surface hardness and ease of removal with a remover formulation.

It is important that the mixture of the acrylic polymers and polyurethane be carefully balanced. The acrylic polymer with a high acid number has a large number of carboxyl groups which react with the hydroxyl groups provided by the ammonium hydroxide and other sources facilitating the removal of the coating by the remover composition. On the other hand the acrylic polymer with the low acid number has fewer carboxyl groups and are more resistant to attack by hydroxyl groups which helps preserve the stability of the coating. Having acrylic polymers with different hardness numbers is also balanced to make sure the coating has sufficient hardness to stand general use but can be easily removed by the remover compositions. The polyurethane provides a hard surface and resistance to attack by hydroxyl groups. Molecules of the acrylic and urethane polymers are intermixed throughout the coating which provides the delicate balance between hardness and amorphous states, resistance to attack and ease of removal by hydroxyl groups. This balance is achieved by a formulation that contains approximately about 22% (by dry weight) of Carboset 514-H, 4% (by dry weight) Carboset 519 and 0.7% (by dry weight) Sancure 815 and 0.3% (by dry weight) ammonium hydroxide.

The coating or paint of this invention is prepared by mixing the acrylic dispersions and the polyurethane dispersions with water and adjusting the pH to between 8 and 8.5 preferably using ammonium hydroxide. Additional water is then added. A pigment may be added to the coating if a colored surface is desired.

Increasing the amount of polyurethane in the paint or coating increases the alkali resistance and surface hardness, but makes the coating or paint more difficult to remove. The same effect can also be obtained by increasing the amount of the acrylic component with the lower acidic value (Carboset®519), which makes the coating or paint more difficult to remove. The correct amount of water must be used in the dispersion.

Pigment can be added to the mixture to make a paint in the normal manner. The water content can be adjusted for the water content of the pigment dispersion. Special effect particles can be added to add texture, or reflection characteristics to the coating or paint in the normal manner. Retro-reflector beads can be added to the paint as it is being applied to roadways and airports to provide reflective character to the paint. Infrared absorbers and reflectors and surface friction modifiers can also be included.

The removable paints of this invention have sufficient adhesion and durability as to be used as a permanent paint if desired. Thus, the paint of this invention can be either permanent or temporary, as desired. This removable paint has the unique ability to heal or regain its adhesion to the surface it is applied to. The characteristic is referred to as "creeping," which enables the removable paint to have a longer life span, which is especially useful in extending the high reflectivity and long life of any retro-reflected beads applied to the paint.

The paint or coating is applied to a surface by spraying, brushing, curtain coating, wire wound rod, rolling or any other satisfactory method of applying a coating or a paint to a surface. This paint or coating works best on surfaces that are hard and smooth or have been sealed in order to make the removal of the paint complete. Otherwise, some of the paint may be lodged in the pores of the surface making it difficult to remove. More intensive scrubbing or the use of a pressure washer with the remover solution will achieve a total removal of the paint in such cases.

Remover Composition

Basically the removable paints and coatings of this invention can be removed by contact with alkaline solutions that have a surfactant. The alkalis react with the carboxylic acid groups to form an acrylic salt which causes a chain extension of the acrylic polymers and dissolution of the film. From 0.2 to 5% by weight of an alkali and thickener is used. Preferably the remover solution consists of ammonium hydroxide, ammonium carbonate, and a surfactant. These remover compositions are brought into contact with the removable paint for a few minutes and agitated by a sponge, mop or brush and then washed away with water. Other alkalis can be substituted for the ammonium hydroxide to reduce the objectionable odor of ammonia.

A preferred remover solution comprises:

| COMPONENT | % BY WEIGHT |
| --- | --- |
| Ammonium hydroxide | 1 to 5 |
| Alkali Thickeners | 2 to 5 |
| Water | balance |

An acrylic polymer thickener may be used with this remover solution. A small amount of ammonium carbonate that is less than 0.5% by weight may also be used. Ethoxylated caster oil may also be used in an amount from 0.1 to 1% by weight. This remover solution preferably has a pH of from 11.5 to 12.5. The pH of the diluted solution is from 8.0 to 9.0.

In the event the paint has been applied to a surface that may be at a high temperature when it is desired to remove the paint, a proprietary mixture composed of organic solvents may be added to the remover. A preferred proprietary mixture is composed of 2-butoxy ethanol, nonylphenol ethoxylate, sodium metasilicate pentahydrate, monoethanolomine and isopropryl alcohol. Preferably the proprietary mixture is added in an amount from 20 to 80% by weight of the solution. An alkali thickener such as an acrylic polymer may be added to this mixture. Preferably the thickeners are added in an amount of from 3 to 7% by weight. Ammonium hydroxide is not necessary with this remover, as the monoethanolamine from the proprietary mixture provides the necessary alkalinity. A small amount of ammonium carbonate may also be added to produce this remover solution. It may be used in an amount of 0.05 to 0.2% by weight as needed to obtain the necessary pH for the remover solution. The proprietary mixture is preferably added to the above remover solution at the end of mixing the regular remover solution. This remover can also be applied by spraying or brushing onto the surface and agitating by a sponge, brush or mop and allowing to set a few minutes and then washing away with water. It will be necessary to not allow any of this residue to escape into the environment. The residue may be collected by a vacuum or other collection means.

Another type of remover composition is a combination of dibasic esters and thickeners. The dibasic esters may be derived from adipic acid, glutaric acid or succinic acid. A thickening agent is used to stabilize the ester water emulsion and provide good flow control. Thickening agents that are preferred include various gums such as xanthan, polyvinyl alcohol and clay derivatives. A surfactant is preferably used with this remover composition.

In some cases the remover composition must be formulated to avoid damaging the surface to which the removable paint or coating is applied. A satisfactory composition for achieving these results is a combination of D-limonene and a dibasic acid ester and N-methyl pyrrolidone.

Any of these remover compositions can contain optional ingredients, such as surfactants, defoamers, corrosion inhibitors, biocides and thickeners. The remover is preferably sprayed on the paint and scrubbed with a brush, allowed to set for a few minutes and washed away with water.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The present invention is described more specifically with reference to the following examples.

EXAMPLE 1

A coating formulation was prepared from the components set forth in Table I. All of the components set forth in Table 1 except for the PROXEL were placed in a slow speed mixer and mixed together. The PROXEL GXL was diluted in water and then added to the mixture.

TABLE I

| NAME OF COMPONENT | % BY WEIGHT | WEIGHT GRAMS |
| --- | --- | --- |
| Carboset ® 514H manufactured by Noveon, Inc. | 81.46 | 21630.72 |
| Carboset ® 519 manufactured by Noveon, Inc. | 15.02 | 3988.48 |
| Sancure ® 815 manufactured by Noveon, Inc. | 2.81 | 745.92 |
| Proxel GXL manufactured by Zeneca Corp. | 0.05 | 14.00 |
| Water (filtered and sterilized) | 0.66 | 174.00 |
| Total | 100.0% | 2653.12 |

The Carboset ® 514-H is an aqueous acrylic colloidal dispersion in which the acrylic has an acid number of about 65 and a hardness temperature (Tg) of about 28° C.
The Carboset ® 519 is also an aqueous acrylic colloidal dispersion in which the acrylic has an acid number of about 32 and a temperature number (Tg) of about 24° C.
The Sancure ® 815 is an aqueous aliphatic urethane polymer dispersion.
The Proxel GXL is a preservative and biocide.

The formulation obtained by mixing the ingredients in Table I is then mixed with ammonium hydroxide and water to achieve a final formulation set forth in Table II. The ammonium hydroxide is a solution of ammonia in water in which the anhydrous ammonia was present in an amount of 28% by weight. The pH of the final formulation was adjusted to between 8.0 and 8.5 by the use of ammonium hydroxide.

Desired pigments or dyes may be added to the mixture. The coating or paint formulation set forth was applied to a surface to be painted by spraying.

TABLE II

| NAME OF COMPONENT | % BY WEIGHT |
| --- | --- |
| Carboset 514-H | 55.1 |
| Carboset 519 | 10.16 |
| Sancure 815 | 1.9 |
| Proxel GXL | 0.04 |
| Ammonium hydroxide (28%) | 0.98 |
| Water | 31.83 |
| Total | 100% |

EXAMPLE 2

A remover was prepared by mixing all of the ingredients set forth in Table III together. The liquids were mixed first and then the thickeners were added. The ammonium carbonate and ammonium hydroxide were then added.

TABLE III

| NAME OF COMPONENT | % BY WEIGHT | WEIGHT IN GRAMS |
|---|---|---|
| Water (sterilized) | 94.34 | 17632.00 |
| Ethoxylated Castor Oil, Trylox 5909 | 0.51 | 96.15 |
| Carbazol violet pigment | 0.05 | 10.00 |
| Fragrance: Grape type | 0.62 | 116.00 |
| Acrylic polymer thickener, Acrysol TT-935 Manufactured by Rohm & Haas | 2.67 | 499.20 |
| Acrylic polymer thickener, Carbopol EZ-3 Manufactured by Noveon, Inc. | 0.61 | 113.52 |
| Ammonium Carbonate | 0.11 | 20.00 |
| Ammonium Hydroxide (28%) | 1.09 | 203.00 |
| | 100% | 18698.87 |

The remover prepared in accordance with the formula in Table III was sprayed and brushed on the surface coated with the coating prepared in accordance with the formula set forth in Table I. The remover solution was agitated on the surface and allowed to set for 6 minutes and then the remover solution and the removable coating were washed away by water leaving an uncoated surface.

EXAMPLE 3

The coating prepared in accordance with Example 1 was coated on a surface and removed with a remover prepared in accordance with a remover having a formulation set forth in Table IV.

TABLE IV

| NAME OF COMPONENT | % BY WEIGHT | WEIGHT IN GRAMS |
|---|---|---|
| Water (sterilized) | 33.31 | 6029.00 |
| Carbazol violet pigment | 0.06 | 10.00 |
| Fragrance: Grape type | 0.96 | 174.00 |
| Acrylic polymer thickener, Acrysol TT-935 Manufactured by Rohm & Haas | 3.45 | 624.00 |
| Acrylic polymer thickener, Carbopol EZ-3 Manufactured by Noveon, Inc. | 0.63 | 113.52 |
| Proprietary Mixture Manufactured by Pro Force | 61.49 | 11130.00 |
| Ammonium Carbonate | 0.11 | 20.00 |
| Total | 100% | 18100.52 |

The proprietary mixture in Table IV is composed of 2-butoxy ethanol, nonylphenol ethoxylate, sodium metasilicate pentahydrate, monoethanolomine and isopropyl alcohol. This remover was prepared by mixing all of the ingredients as described in Example 2 and then adding the described proprietary mixture at the end of the mixing cycle. This remover was sprayed onto the surface and brushed and allowed to set for a few minutes and then washed away with water and collected in a collection chamber.

EXAMPLE 4

A coating prepared in accordance with Example 1 was sprayed on a concrete surface and removed with a remover of the formulation of Table V. The remover was sprayed on the concrete and brushed and allowed to set for several minutes and washed away with water along with the coating and collected in a collection chamber.

TABLE V

REMOVER FORMULATION

| MATERIAL | % BY WEIGHT |
|---|---|
| Water | 53.04 |
| Isopropanol | 6.00 |
| Ethylene glycol monobutyl ether, Glycol Ether EB sold by Equistar Chemicals, LP | 10.00 |
| Acrylic polymer thickener, Carbopol EZ-3 manufactured by Noveon, Inc. | 0.60 |
| Surfactant, that is a mixture of linear secondary alcohols reacted with ethylene oxide, Tergitol 15-S-7, manufactured by Union Carbide Corp. | 18.00 |
| Monoethanolamine | 10.00 |
| Wacker ® Silicone SE 21 (10%) As an antifoamer | 0.24 |
| Potassium silicate solution sold as Kasil ® | 1.7 |
| KOH 45% | 0.38 |
| Purple Dye S-578 | .04 |
| Total | 100.00 |

The remover was prepared by heating water in a tank via a steam sparge to a temperature of approximately 120 to 140° F. while being agitated at a slow speed. The isopropanol and Glycol Ether EB were then added and mixed for 5 minutes. The Carbopol EZ-3 was then sifted in very slowly and the agitation increased to disperse and dissolve. The mixing included until the Carbopol EZ 3 was dissolved. The Tergitol 15-S-7 and monoethanolamine, Wacker® silicone SE 21 and KASIL was added and mixed for 15 minutes. The KOH was then added very slowly in a precise amount. The dye was then added and mixed for 30 minutes. The specifications for the remover are set forth below.

QC SPECIFICATIONS

| Test | Range |
|---|---|
| Color | Dark Purple |
| Appearance | Hazy, Viscous Liquid |
| pH | 11.5 to 12.5 |
| Specific Gravity | 1.120 to 1.128 |
| Viscosity, cPs 5/30 | 500 to 1500 cPs |
| Refractometer (1:1) | 19 to 21 |

Therefore, having thus described the invention, at least the following is claimed:

1. A weather resistant, rapidly removable coating composition comprising:
   (a) an acrylic polymer comprising 19 to 26% by weight of an acrylic polymer with an acid number of between 60 and 70 and a hardness temperature (Tg) of between 26° C. and 30° C., and 2.4 to 6% by weight of an acrylic polymer with an acid number of between 28 and 34 and a hardness temperature (Tg) of between 22° C. and 26° C.;
   (b) an aliphatic water-borne urethane polymer in an amount of from 0.4 to 1.2% by weight and having a viscosity (cP) of from 120 to 130 and a pH of 8+/−1.5; and
   (c) ammonium hydroxide in an amount of from 0.06 to 0.6% by weight to achieve a pH of the composition of from 8 to 8.5.

2. A weather resistant, easily removable paint composition for application over a surface or over another paint, the removable paint composition comprising:
(a) from about 19 to about 34% by weight of a combination of two different acrylic polymers, wherein one of the two acrylic polymers is present in an amount of approximately 22% by weight and has an acid number of approximately 65 and a hardness temperature ($T_g$) of 28° C., and other of the two acrylic polymers is present in an amount of approximately 4% by weight and has an acid number of approximately 32 and a hardness temperature ($T_g$) of 24° C.;
(b) aliphatic water-borne urethane polymer, wherein the aliphatic water-borne urethane polymer has a viscosity (cP) of approximately 125 and a pH of 8+/−1 and is present in an amount of approximately 0.7% by weight;
(c) alkali, wherein the alkali is ammonium hydroxide that is present in an amount of 0.06 to 0.6% by weight as needed to achieve a pH of the removable paint composition between 8 and 8.5;
(d) water;
wherein easily removable paint can be removed without damaging underlying surface or paint;
wherein one of the two acrylic polymers is present in an amount of approximately 22% by weight and has an acid number of approximately 65 and a hardness temperature (Tg) of 28° C., and the other of the two acrylic polymers is present in an amount of approximately 4% by weight and has an acid number of approximately 32 and a hardness temperature (Tg) of 24° C.;
wherein the aliphatic water-borne urethane polymer has a viscosity (cP) of approximately 125 and a pH of 8+/−1 and is present in an amount of approximately 0.7% by weight; and
wherein the alkali is ammonium hydroxide that is present in an amount of 0.06 to 0.6% by weight as needed to achieve a pH of the easily removable paint composition between 8 and 8.5.

3. The weather resistant, easily removable paint composition according to claim 2; further comprising a dispersible pigment in an amount sufficient to achieve a desired color of the weather resistant, easily removable paint.

4. The weather resistant, easily removable paint composition according to claim 3; further comprising effect particles in an amount sufficient to achieve a special effect in weather resistant, easily removable paint.

5. The weather resistant, easily removable paint composition according to claim 3; further comprising reflective beads.

6. The weather resistant, rapidly removable coating composition according to claim 1; further comprising a dispersible pigment in an amount sufficient to achieve a desired color of coating.

7. The weather resistant, rapidly removable coating composition according to claim 6; further comprising effect particles in an amount sufficient to achieve a special effect in weather resistant, rapidly removable coating.

8. The weather resistant, rapidly removable coating composition according to claim 6; further comprising reflective beads.

9. The weather resistant, rapidly removable coating composition according to claim 1; further comprising effect particles in an amount sufficient to achieve a special effect in weather resistant, rapidly removable coating.

10. The weather resistant, rapidly removable coating composition according to claim 1; further comprising reflective beads.

11. A durable, weather resistant and easily removable paint composition for application over a surface or over another paint, the removable paint composition comprising: a balanced mixture containing two different acrylic polymers, an aliphatic water-borne urethane polymer, an alkali, and water, the two acrylic polymers being different from one another in each of percentage by weight, acid number, and hardness temperature, thereby providing a paint that can be removed without damaging the underlying surface or paint; wherein one of the two acrylic polymers is present in an amount of 19 to 26% by weight and has an acid number of between 60 and 70 and a hardness temperature (Tg) of between 26° C. and 30° C.; and wherein the other of the two acrylic polymer is present in an amount of 2.4 to 6% by weight and has an acid number of between 28 and 34 and a hardness temperature (Tg) of between 22° C. and 26° C.

12. A durable, weather resistant and easily removable paint composition for application over a surface or over another paint, the removable paint composition comprising: a balanced mixture containing two different acrylic polymers, an aliphatic water-borne urethane polymer, an alkali, and water, the two acrylic polymers being different from one another in each of percentage by weight, acid number, and hardness temperature, thereby providing a paint that can be removed without damaging the underlying surface or paint;
wherein the aliphatic water-borne urethane polymer is present in an amount of from 0.4 to 1.2% by weight and has a viscosity (cP) of from 120 to 130 and a pH of 8+/−1.5; and
wherein the alkali is ammonium hydroxide and is present in an amount of from 0.06 to 0.6% by weight to achieve a pH of the composition of from 8 to 8.5.

13. A paint composition according to claim 12; wherein the aliphatic water-borne urethane polymer is present in an amount of approximately 0.7% by weight; and wherein the ammonium hydroxide is present in an amount of approximately 0.28% by weight.

* * * * *